United States Patent [19]

Christof

[11] Patent Number: 5,141,424
[45] Date of Patent: Aug. 25, 1992

[54] SECTOR MOLDS WITH RADIAL RECOIL COMBINED WITH SWINGING

[75] Inventor: Walter Christof, Toul, France
[73] Assignee: Pneumatiques Kleber, Laxou, France
[21] Appl. No.: 680,395
[22] Filed: Apr. 4, 1991
[30] Foreign Application Priority Data
  Apr. 19, 1990 [FR] France ............... 90 05106
[51] Int. Cl.⁵ .............................. B29C 35/02
[52] U.S. Cl. ..................... 425/28.1; 425/46; 425/47
[58] Field of Search .................. 425/28.1, 46, 47

[56] References Cited

U.S. PATENT DOCUMENTS

| B 485,169 | 3/1976 | Tippin | 264/315 |
| 3,922,122 | 11/1975 | Battasso et al. | 425/47 |
| 3,989,791 | 11/1976 | Tippin | 264/315 |
| 3,990,823 | 11/1976 | Le Moullac | 425/47 |
| 4,289,463 | 9/1981 | Le Moullac | 425/47 |
| 4,580,959 | 4/1986 | Pizzorno et al. | 425/46 |
| 4,931,004 | 6/1990 | Fogarasi et al. | 425/47 |

FOREIGN PATENT DOCUMENTS 1522640 4/1968 France.
1590815 4/1970 France.

Primary Examiner—Jay H. Woo
Assistant Examiner—C. Scott Bushey
Attorney, Agent, or Firm—Brumbaugh, Graves, Donohue & Raymond

[57] ABSTRACT

Upon the opening of this sector mold 30, the rods 43, which penetrate into recesses 39 which are pierced through plates 37, assure purely radial mold removal by producing a pull on the sectors 30. This arrangement is compatible with a subsequent swinging of the sectors 30.

6 Claims, 7 Drawing Sheets

SECTOR MOLDS WITH RADIAL RECOIL COMBINED WITH SWINGING

BACKGROUND OF THE INVENTION

The present invention relates to sector molds for tires, particularly molds such as described in U.S. Pat. No. 4,289,463.

This type of mold comprises a lower molding part, an upper molding part, and a series of sectors to assure the molding of one side wall, of the other side wall and of the tread of the tire, respectively. Furthermore, the mold comprises a peripheral hoop which surrounds the sectors, causing their radial closing movement (radial movement of all the sectors towards the center) and holding them firmly closed in order to withstand the molding pressure. The opening of the mold, in addition to a suitable kinematic system, employs the action of springs in order to return the sectors, that is to say, to move them away from the center of the mold, and in order to cause them to swing slightly. For further details, reference may be had to the above mentioned patent.

The advantage of this type of mold over container molds in which the sectors accompany the upper molding part which lifts up upon the opening of the mold resides in the fact that the weight to be lifted in order to open the mold is much less since the entire tread molding part remains on the lower plate of the press, in the same way as the lower molding part. Furthermore, the improvement proposed in the said patent takes up less diametrical space. Now, for the same space, it makes it possible to mold tires of larger diameter. In fact, the swinging of the sectors makes it possible to reach more rapidly a diameter of release which is sufficient to remove the vulcanized tire.

Many tread patterns molded on the treads of tires, in particular tires for passenger cars, comprise numerous sipes. This makes it necessary to assure a purely radial movement of recoil upon the removal from the mold in order to limit, as far as possible, the mold-removal forces imposed on the tire and on the inserts molding the sipes. Now, in the mold which is the subject of said patent, the radial recoil springs by themselves assure the opening movement of the series of sectors. The opening takes place in the following manner: The release of the peripheral hoop is not accompanied by any movement of the molding parts. The moving away of the upper molding part permits the swinging of the sector under the action of the spring or springs interposed between the lower molding part and each sector; the sectors being all released from the tread, they then all move apart under the action of the radial recoil springs.

With this known mold, it is impossible to cause the radial recoil before the swinging. In fact, the force for tearing a sector away from the vulcanized tread is very great, since there is a sticking effect of the sector on the tread. It is not possible to install radial recoil springs which are sufficiently strong to overcome this sticking in all cases which may be encountered. The theoretical spring necessary to develop sufficient force would be too large.

In sector molds of purely radial recoil, the recoil movement is caused by sliderails of the "dovetail" type and this type of control is incompatible with the swinging of the sector. The invention is directed at reconciling the purely radial movement of recoil upon the phase of removal from the mold of the tread pattern taking place at the very beginning of the recoil, with a subsequent swinging of the sectors in order to take up as little space as possible.

SUMMARY OF THE INVENTION

In accordance with the invention, the sector mold for the molding and vulcanizing of tires, of the type having a lower molding part for the molding of one sidewall of the tire, an upper molding part for the molding of the other sidewall and a series of sectors for the molding of the tread as well as a ring for the closing and hooping of the series of sectors, the opening and closing movements involving a radial recoil and swinging upward of the sectors towards the outside, as well as elevation of the upper molding part, the radially outer face of each sector being inclined so as to cooperate with the complementary inclined face of said ring, which ring may be lifted and lowered separately from the upper molding part, each sector being permanently urged towards the recoiled, swung position by one or more springs, is characterized by the fact that each sector is provided with at least one horizontal protuberance which extends radially beyond said inclined face, each protuberance being pierced by a recess, and by the fact that the ring comprises, in correspondence with each recess, an inclined rod arranged so as to be capable of penetrating into the recess upon the closing of the mold and cooperating with said protuberance in order to cause the radial recoil of the sectors upon the opening of the mold.

Mounted in the vulcanization press, the lower molding part is firmly attached to the fixed lower plate of the press; the upper molding part is firmly attached to an upper plate which is moveable along the axis of the mold. The closure ring is firmly attached to a mechanism which assures the movement along the axis of the mold, separately from the preceding movement. The radially inner face of the closure ring is generally a frustoconical face. The radially outer face of the sectors which cooperates, as is well known, with the closure ring is also frustoconical and corresponds precisely to the said radially inner face of the ring. The inclination of the cone frustums is such that, as from a certain distance apart of the sectors, a lowering of the ring by a movement parallel to the axis of the mold in a direction extending from the upper plate towards the lower plate by the sliding of the frustoconical faces on each other causes a displacement of the sectors in the radial direction towards their closed position.

There is no doubt that it is the inclination with respect to the axis of the mold which assures this kinematic action, the arrangement as cone frustum being merely one specific non-limitative embodiment. This is the reason why these faces are referred to as "inclined" in the claims while, in the description, reference is had to conical frustums.

DESCRIPTION OF THE DRAWINGS

The invention is illustrated below with reference to an embodiment shown in the accompanying drawings in which:

FIG. 7 is a section along the line XX of FIG. 4;

FIG. 7'is a section along the line X'X' of FIG. 4;

FIGS. 1, 2 and 6 are sections along the line YY of FIG. 7;

FIGS. 3, 4 and 5 are sections along the line Y'Y' of FIG. 7.

DESCRIPTION OF PREFERRED EMBODIMENTS

Figure 1:
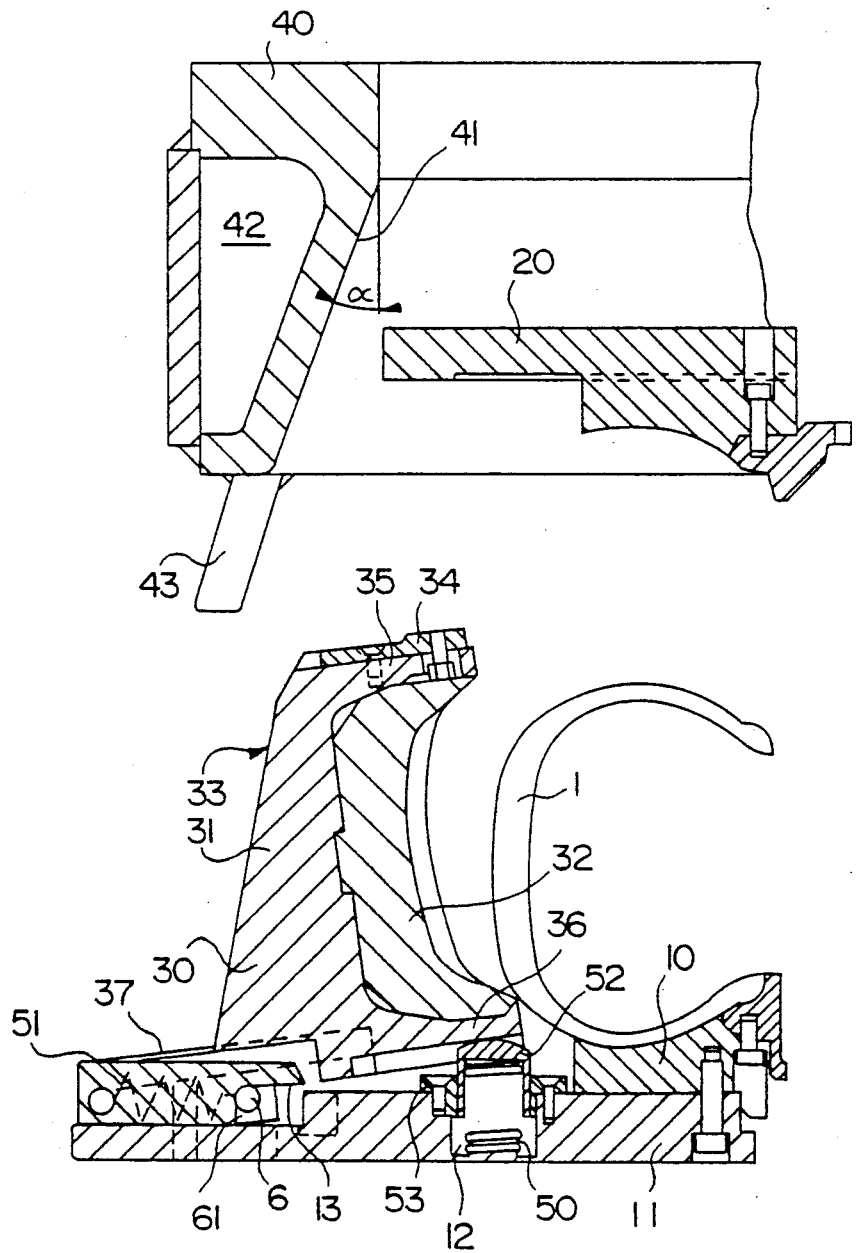
FIGS. 1, 2, 3 and 3' show the mold of the invention during the closing.
Figure 2:
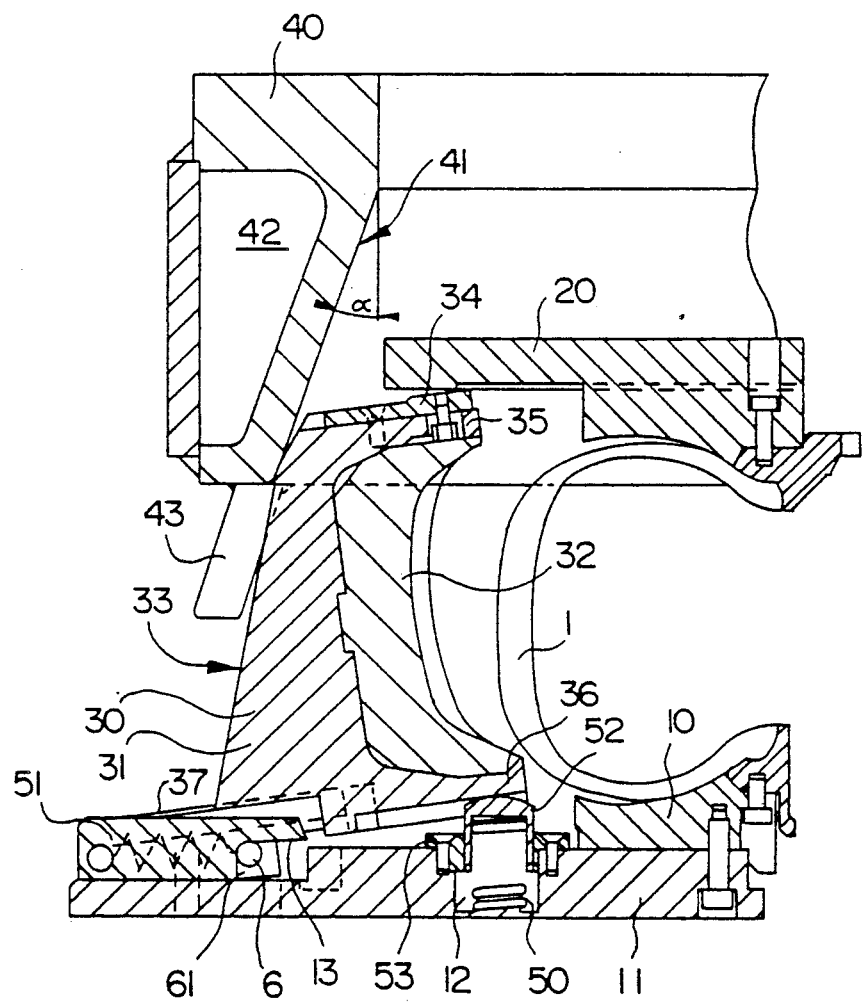

The various figures show the lower molding part 10, which is firmly attached to the lower plate 11, the upper molding part 20 and one sector 30 of the series of sectors assuring the molding of the tread. This sector 30 is formed of a support part 31 and of a part 32 which assures the molding of the tread. The sector 30 has a frustoconical face 33 inclined by an angle $\alpha$. Slide plates 34 are screwed onto the upper end 35 of sector 30 in order to promote the sliding of the sector 30 along the upper molding part 20, and also in order to limit the wear which might be produced by the contact between sector 30 and the upper molding part 20 occurring upon the closing kinematics of the mold.

The peripheral ring 40 has a frustoconical radially inner face 41 the inclination of which is identical to the inclination $\alpha$ of the face 33 of the sectors 30. The inner cavity 42 permits the flow of a heating fluid in order to effect the vulcanization.

The sectors 30 are acted on continuously by springs 50, 51, upon swinging and radial recoil. Each spring 50 is arranged in a recess 12 provided in the lower plate 11. Each spring 50 tends to push a pusher 52 upwards, the stroke of the pusher being limited by a stop 53 fastened on the lower plate 11.

The pusher 52 acts on the lower part 36 of the sector 30 at the radially inner end thereof. The tension springs 51 continuously tend to move the sectors 30 back towards their open position and this radial recoil is limited by the ring 40, as well as by the pin 6 which is firmly fastened to each sector 30. The central part 61 of the pin 6 can slide in a slot 13 limiting the radial movement permitted for the pin 6.

Each sector 30 has two plates 37 attached by screwing to the lower part 36. The shear pins 62 assure the transmission of the forces of the plates 37 to the sectors 30. Each plate 37 forms a horizontal protuberance 38 which extends radially beyond the inclined face 33 forming the back of each sector 30. A recess 39 is pierced through each plate 37 at the level of said protuberance 38. At the place of each recess, the ring 40 has an inclined rod 43 which extends axially downward with respect to the ring 40.

Figure 4:
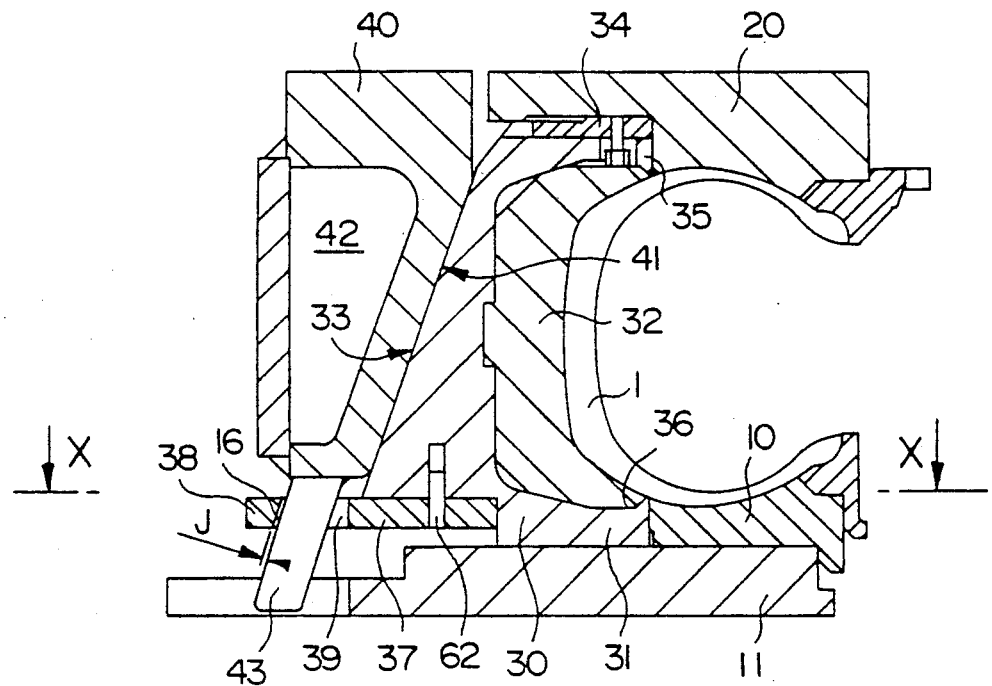
FIGS. 4 and 4' show the mold of the invention when closed.
Figure 4A:
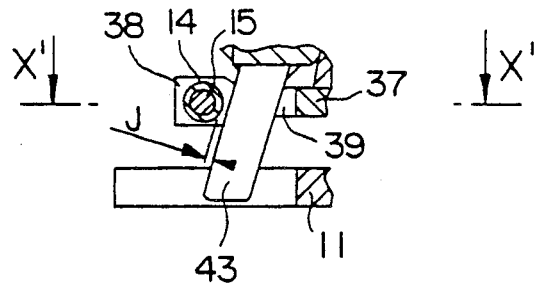
Figure 5:
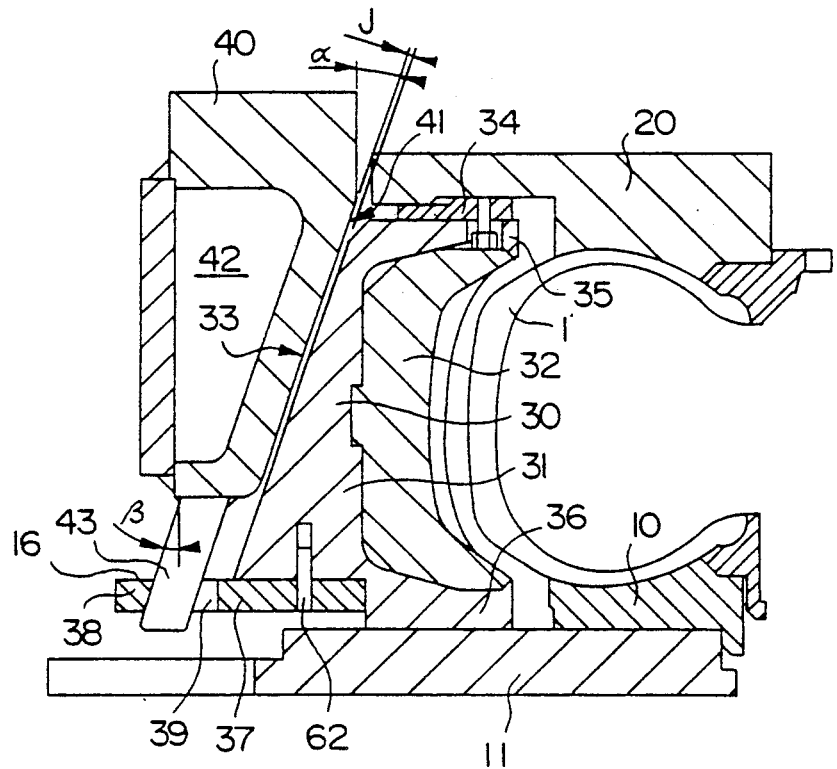
FIGS. 5, 5' and 6 show the mold of the invention during opening.
Figure 5A:
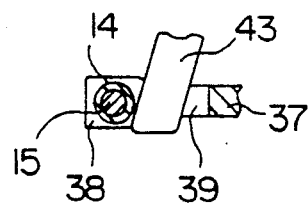
Figure 6:
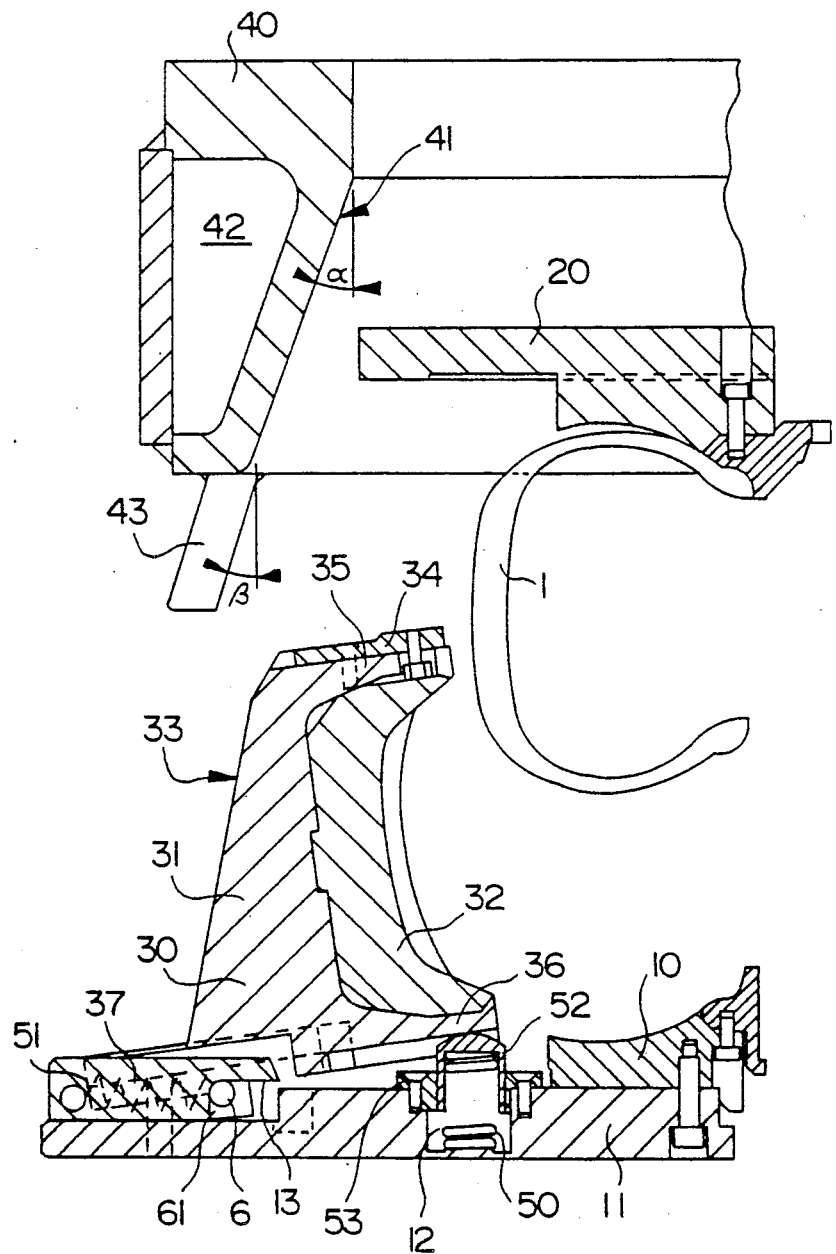
Figure 7:
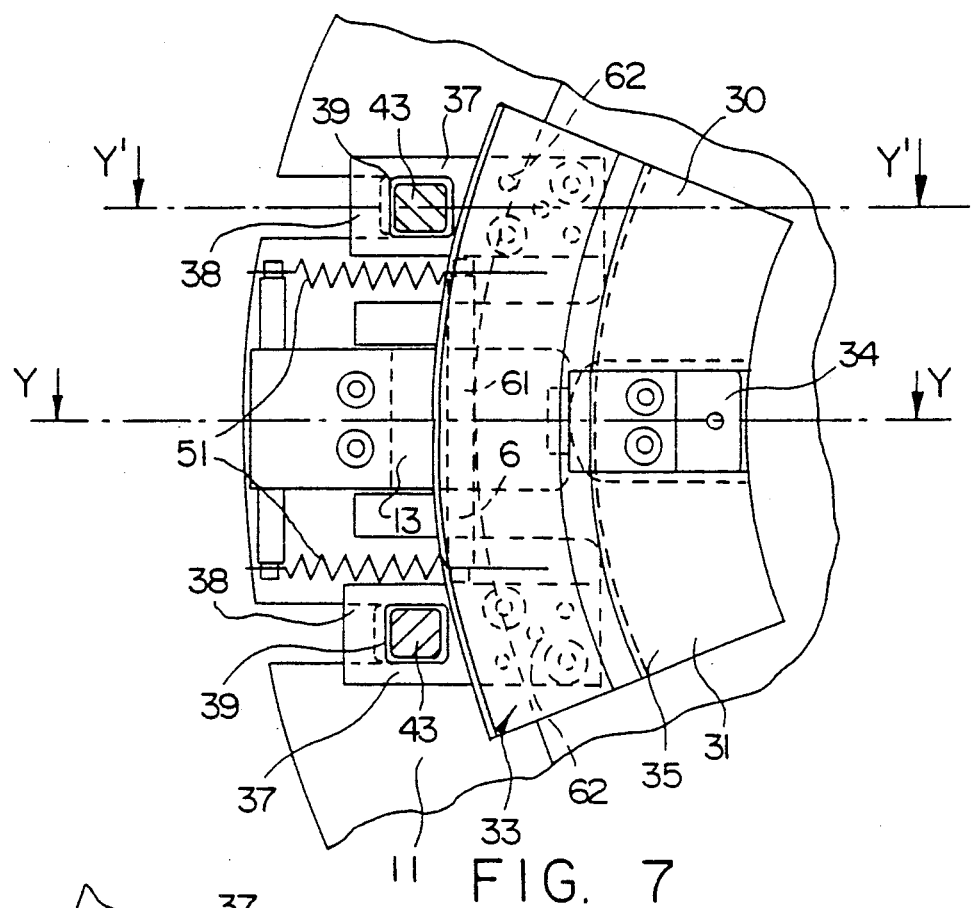
FIGS. 7 and 7' are partial sections perpendicular to the axis of the mold.
Figure 7A:
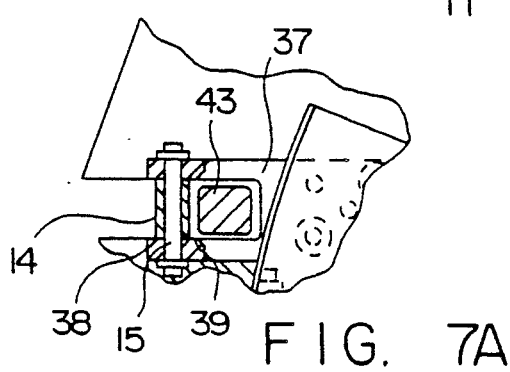

The operation of the mold is as follows: After the tire 1 to be vulcanized has been introduced, the upper molding part 20 and the ring 40 are lowered in accordance with the procedure customary for this type of mold. The specific means of the present invention, namely the plates 37 and the rods 43, do not have to intervene in order to assure the closing of the mold. From FIG. 3, it can be seen that the rods 43 can freely penetrate into the recesses 39 without coming into contact with the plates 37. FIG. 4 shows the mold in completely closed position: there is a radial clearance J between the radially outer side of each rod and the corresponding edge 16 of the recess 39. In order to open the mold, it is necessary, first of all, while keeping the upper plate (and, therefore, the upper molding part 20) stationary, to lift the ring 40. From FIG. 5, it can be noted that the ring 40 releases the sectors 30, the rods 43 coming into contact with the edges 16 of the recesses 39 and the clearance J being brought between ring 40 and sectors 30. The action of the tension springs 51 is insufficient to remove the sectors 30 from the vulcanized tire and the sectors, therefore, remain in their closed position, swinging under the action of the springs 50 being made impossible by the presence of the upper molding part 20, which is still in contact with the sectors 30.

Upon continuation of the movement of elevation of the ring 40, the rods 43 effect a pull on the sectors 30 and, therefore, force the purely radial recoil movement which is favorable to the good removal from the mold of the pattern of the tread, without causing defects in it. The inclination $\beta$ of the rods 43 is preferably less than the inclination $\alpha$ of the frustoconical faces 41 and 33, which, added to the clearance J, prevents wedging upon the opening and prevents collision between parts upon the closing.

Figure 3:
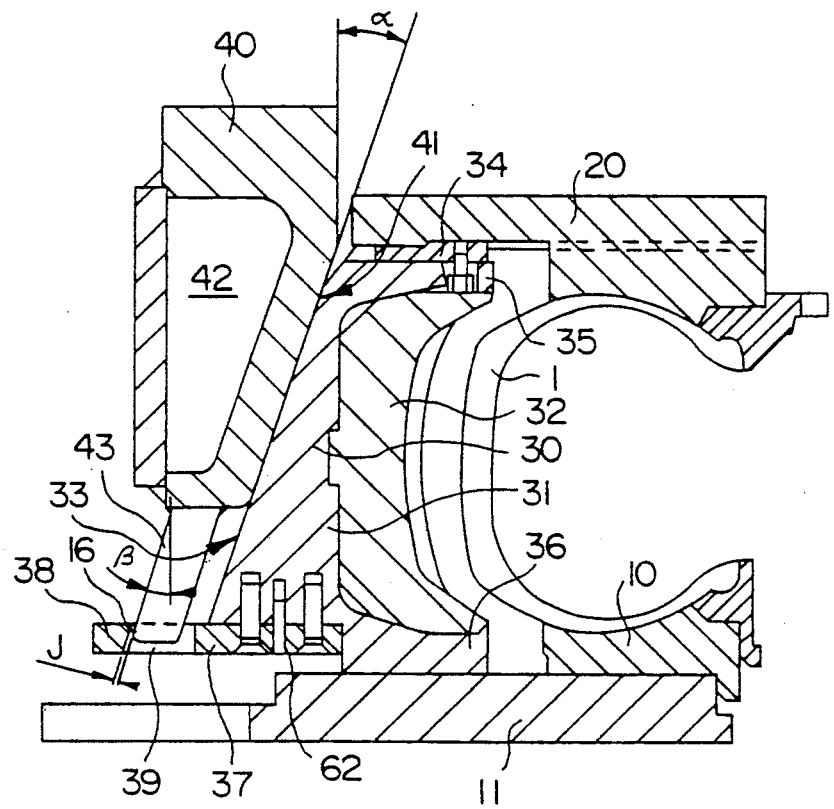
Figure 3A:
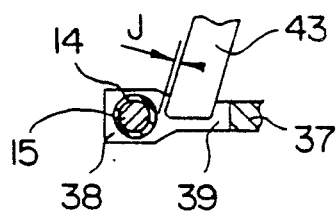

FIGS. 3', 4', 5' and 7' show a variant embodiment of the plates 37. The sliding friction of the parts 43 on the edge 16 is replaced by rolling friction. For this purpose, a wear roller 14 is used, mounted movably in rotation on a pin 15 arranged at the end of the plates 37 and closing the recess 39. This variant permits an adjustment of the clearance J by acting on the diameter of the wear roller 14.

As soon as the tread pattern is removed from the mold, it is no longer necessary for the recoil to be purely radial. The upper molding part 20 can be lifted and the following opening movement of the sectors is assured, as known, by springs 50 and 51.

In addition to the fact that it makes it possible to assure purely radial recoil upon removal from the mold, combined with a subsequent swinging of the sectors 30, the invention imposes only a minimum number of changes in the known molds and, therefore, makes it possible to assure a large gain in quality of molded tires with a minimum of investment. Furthermore, the drive of the radial recoil does not require any great precision in machining and/or mounting, which constitutes another advantage of the present invention.

I claim:

1. A sector mold (30) for the molding and vulcanizing of tires, said mold including a lower molding part (10) for the molding of one sidewall of the tire, an upper molding part (20) for the molding of the other sidewall, and a series of sectors (30) for the molding of the thread, as well as a ring (40) of the closing and hooping of the series of sectors (30), the sectors being mounted for movement upwardly and outwardly with a spring bias and the upper molding part being raised to open the mold, the radially outer face (33) of each sector (30) being inclined so as to cooperate with the complementary inclined face (41) of said ring (40), the ring (40) being raised and lowered separately from the upper molding part (20), each sector (30) being continuously urged towards the open position by one or more springs, the improvement in which each sector (30) is provided with at least one horizontal protuberance (38) which extends radially beyond said inclined face (33), each protuberance being pierced by a recess (39), and in which the ring (40) comprises, in correspondence with each recess (39), an inclined rod (43) which penetrates the recess (39) during closing of the mold can cooperates with said protuberance (38) in order to cause the radial, outward movement of the sectors (30) during opening of the mold.

2. A mold according to claim 1, in which, in closed position, there is radial clearance (J) between the radially outer side of each rod (43) and the corresponding edge (16) of its recess (39).

3. A mold according to claim 1, in which the said radially outer face (33) of each sector (30) is inclined by an angle $\alpha$ with respect to the axis of the mold and each rod (43) in inclined by an angle $\beta$ which is slightly smaller than $\alpha$.

4. A mold according to claim 1, in which said protuberance (38) is formed by at least one plate (37) attached to the lower part (36) of each sector (30), said recess (39) being pierced through said plate (37).

5. A mold according to claim 4, in which a roller (14) is mounted movably in rotation on a pin (15) which is arranged on the end of said plates (37) and closing said recess (39).

6. A mold for the molding and vulcanizing of tires, said mold including a lower molding part (10) for the molding of one sidewall of the tire, an upper molding part (20) for the molding of the other sidewall, at least one sector (30) for the molding of the tread, and closing means (40) for closing the sector (30), the sector (30) moving upwardly and outwardly and the upper molding part moving upwardly to open the mold, the radially outer face (33) of the sector (30) being inclined so as to cooperate with a complementary inclined face (410 of said closing means (40), the sector closing means (40) being raised and lowered separately from the upper molding part (20), comprising spring means continuously urging the sector upwardly and outwardly to open position, sector opening means carried by a sector radially outwardly of said inclined face and means carried by the closing means and clearing the sector opening means during closing of the mold when the sector is not in closed position and engaging said sector opening means when the sector is in closed position to impart radial outward movement to the sector during opening of the mold before the spring means imparts movement to the sector.

* * * * *

UNITED STATES PATENT AND TRADEMARK OFFICE
CERTIFICATE OF CORRECTION

PATENT NO. : 5,141,424
DATED      : Aug. 25, 1992
INVENTOR(S) : Christof

It is certified that error appears in the above-identified patent and that said Letters Patent is hereby corrected as shown below:

Col. 2, line 63, "3'" should read --3A--;
        line 65, "4'" should read --4A--;
        line 67, "5'" should read --5A--.

Col. 3, line 1, "7'" should read --7A--;
        line 4, "7'" should read --7A--.

Col. 4, line 21, "3', 4', 5' and 7'" should read --3A, 4A, 5A and 7A--;
        line 67, "can" should read --and--.

Col. 6, line 7, "(410" should read --(41)--.

Signed and Sealed this

Nineteenth Day of October, 1993

Attest:

BRUCE LEHMAN

Attesting Officer    Commissioner of Patents and Trademarks